Sept. 8, 1925.   
L. B. BARTH  
RESILIENT TIRE  
Filed April 17, 1922  
1,553,018
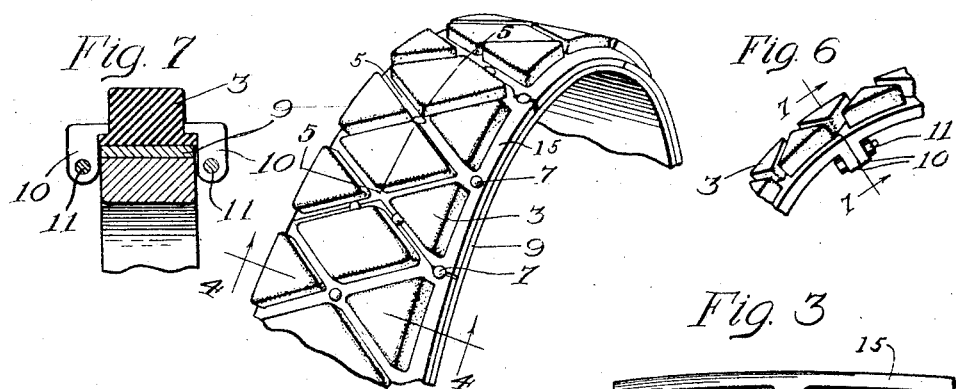
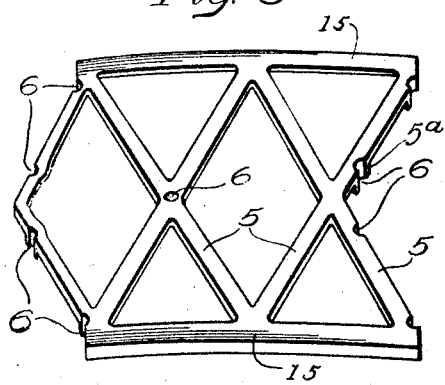
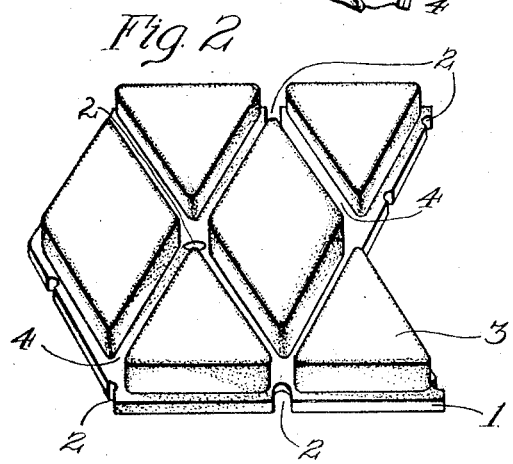
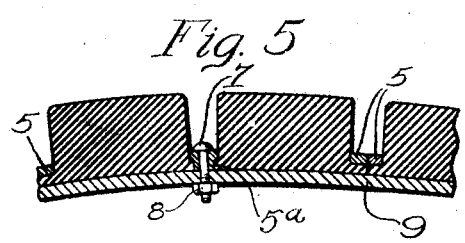
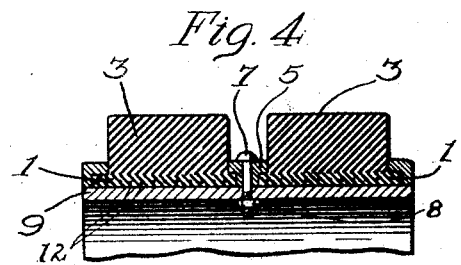
Inventor  
Luther B. Barth.  
By: Walter E. Woolf  
his Attorney Patented Sept. 8, 1925.

1,553,018

UNITED STATES PATENT OFFICE.

LUTHER B. BARTH, OF ST. PAUL, MINNESOTA, ASSIGNOR, BY MESNE ASSIGNMENTS, TO DURKEE-ATWOOD COMPANY, OF MINNEAPOLIS, MINNESOTA, A CORPORATION OF MINNESOTA.

RESILIENT TIRE.

Application filed April 17, 1922. Serial No. 553,957.

*To all whom it may concern:*

Be it known that I, LUTHER B. BARTH, a citizen of the United States, residing in the city of St. Paul, county of Ramsey, and State of Minnesota, have invented a new and useful Resilient Tire, of which the following is a specification.

This invention relates to an attachment for vehicle wheels, such as the wheels of motive trucks or tractors, and particularly, to a tread covering for such wheels. Such vehicles are now commonly made with wheels having plain iron rims used either with or without a felloe. It is desirable to have a resilient tread on many of such wheels to absorb the shock and vibration and thus produce a smooth running vehicle.

It is an object of this invention, therefore, to provide a device comprising sectional resilient pads formed as segments of a complete tread covering, which pads are formed with projections and intermediate grooves and are held in place on the rim by an openwork section of similar shape which fits in and lies in said grooves.

It is a further object of the invention to provide such resilient segmental tread sections and the open work sections for securing the same in place with salient and re-entrant angles, respectively, at the ends thereof, said pads and openwork sections being further provided with means for securing the same to the rim of the wheel.

These and other projects and advantages of the invention will be fully set forth in the following description made in connection with the accompanying drawings, in which like reference characters refer to the same parts throughout the different views, and in which, Fig. 1 is a perspective view of a portion of a wheel rim showing the invention applied thereto;

Fig. 2 is perspective view of one of the resilient pad sections used;

Fig. 3 is perspective view of one of the openwork metal sections for holding the pads in place;

Fig. 4 is vertical section taken on the line 4—4 of Fig. 1, as indicated by the arrows;

Fig. 5 is a longitudinal section taken on the line 5—5 of Fig. 1, as indicated by the arrows;

Fig. 6 is a perspective view of a portion of a wheel showing a modified form of the invention; and Fig. 7 is a vertical section taken on the line 7—7 of Fig. 6, as indicated by the arrows.

Referring to the drawings, a metal rim of a vehicle wheel, such as used in certain types of automobiles and tractors is shown as 9, to which rim is applied a tread covering comprising segmental sections and segmental metal holding devices therefor. The tread of the wheel is thus formed of a pad or section shown in Fig. 2 and the holding devices shown in Fig. 3. The said pads comprise a base portion 1 of uniform thickness, which extends substantially entirely across the rim 9 of the wheel. This base portion may, if desired, be made of hard rubber, or of resilient rubber-like material of the same nature as the resilient projections 3 extending radially therefrom, or the same may be made of rubber or rubber-like fabric suitably reinforced by wire or other material, as shown at 12 in Fig. 4. The projections 3, preferably, are made in the form of closed figures having straight sides and, in the embodiment of the invention illustrated, are shown as being of diamond or half diamond shape. These projections are separated and defined by the grooves 4 extending between the same and to the base portion 1, which grooves, as clearly shown in Figs. 1 and 2, extend diagonally across the tread of the wheel in opposite directions and intersect at the center and edges of the pad. The sections or pads are divided along the center of one of the grooves 4 and thus have a salient angle at one end and the re-entrant angle at the other end disposed centrally of the pad. The base portion 1 extends at the sides of the pad to form a flange, and the pad is provided with a plurality of holes 2 at the edges and ends thereof and at the intersection of the grooves for receiving holding means. The pads 1 are placed on and in contact with the rim 9 of the wheel and are held in place by the openwork metal section shown in Fig. 3. These sections comprise the side members 15 between which extend the diagonal strips or ribs 5 which, like the grooves 4, are inclined transversely of the tread and extend in opposite directions so as to intersect substantially at the center and sides of the section. The side portions 15 are provided with inwardly extending flanges which fit over the side flanges on the pads and, as shown in Fig. 4, are disposed substantially flush with the side edges of the member 9. The metal sections are divided at their ends along the center of one of the ribs 5 and are thus, like the pads, formed with a salient and re-entrant angle at their ends, the ribs 5, at their ends, thus being substantially half the width of the intermediate ribs 5. The ribs 5 are provided with inwardly extending bosses 5ª at spaced points therein, which bosses are pierced by the holes 6 adapted to receive attaching bolts. The bosses 5ª are arranged to extend through the holes 2 of the pads when the pads and openwork sections are secured to the rim. The pads in the form shown in Figs. 1 to 4 are secured to the rim by the bolts 7 having thereon the nuts 8, as clearly shown in Figs. 4 and 5.

It will thus be seen that the resilient pads fit around the wheel and form a complete tread, the salient angle of one pad fitting in the re-entrant angle in the adjacent pad and the flanges formed by the divided bottoms of the grooves fitting together to form the bottom of the complete groove and the end ribs of the openwork sections, likewise, fitting together to form a rib of full width. The pads and sections are thus assembled to form a secure and continuous tread on the wheel. The wear on the tread occurs altogether on the projections 3. If one of the projections becomes badly worn or cut by some object, the section containing the same can readily be removed and replaced without disturbing the other sections or necessitating the use of an entire new tread. Each projection 3 is well secured and braced by the ribs 5. The pads are enclosed at their sides and practically entirely embraced by the openwork sections, thus preventing undue distortion of the projections 3.

In the modifications shown in Figs. 6 and 7, the sections are illustrated as of narrower width comprising only triangular projections, although pads of the width shown in Fig. 2 could be used, if desired. The openwork sections are used and instead of bolting the same through the rim of the wheel, the said sections are provided with projecting lugs 10, which project inwardly radially of the wheel and are formed with alining holes. These openwork sections are arranged on the wheel with the lugs 10 slightly spaced. Headed and nutted bolts 11 are then placed through the lugs 10 and then tightened to bring the lugs 10 substantially into contact. This decreases the circumference of said sections and causes the same tightly to bind on the wheel so that the said sections and pads are thus firmly secured to the wheel. The structure shown in Figs. 6 and 7 may be used with a wheel having a felloe, as shown in Fig. 7.

From the above description it is seen that applicant has provided a simple and efficient tread device for a wheel rim. The same can be easily made and easily and quickly applied to a wheel, and furthermore, can be applied to practically all standard wheels having an iron rim or tire. Any portion of the tread which becomes worn or damaged can be quickly replaced by removing and replacing the section containing the damaged portion.

It will be noted that in applicant's tread there is always a certain amount of the tread surface of the pads in engagement with the ground. The tread pressure is first on the central diamond-shaped pad and then passes to the lateral triangular pads. Owing to the diagonal groove, the pressure is transferred gradually and uniformly from the center pad to the side pads. There are, therefore, no separate grooves in the tread surface extending transversely substantially at right angles to the line of travel and the tread gives a smooth running effect without any bumping, as would be the case where there are such transverse grooves separating the pads. Also, the symmetrical disposition of the diamond-shaped and triangular pads resulting in a balanced tread so that there is no tendency to distort the pads all in one direction which places a lateral strain upon the wheel. If the dividing grooves run only in one direction such a lateral strain effect would be produced. Furthermore, by the arrangement of the diagonal intersecting grooves, a large area of tread surface relatively to the width of the rim is obtained and there are no grooves running circumferentially around the wheel. Where the wheel is slipping therefore, in mud or wet earth, one pad will not pass into the depression made by the preceding pad but a new grip can be taken by the successive diamond-shaped and triangular-shaped pads. This, together with the fact that a large area of tread surface is obtained, gives applicant's pad a very great gripping capacity and the load capable of being hauled on a tractor in using applicant's pad is greatly increased.

It is also a great advantage to have the base portion of the pad of hard rubber or of reinforced construction. The hauling stress is thus placed on a very strong base and the pads are very securely held. The wear incident to the metal holding device contacting the pads comes on a hard surface and the wear is thus much less than would be the case if the metal devices contacted the soft resilient rubber.

The invention has been actually demonstrated in practice and found to be very successful and efficient and is being commercially manufactured.

It will, of course, be understood, that various changes may be made in the form, details, arrangement and proportions of the parts without departing from the scope of applicant's invention, which, generally stated, consists in the matter shown and described and set forth in the appended claims.

What is claimed is:

1. A tread attachment for a wheel rim comprising segmental resilient pads each having a base portion with a diamond and half-diamond shaped projections thereon, divided by intersecting grooves extending diagonally and oppositely across said pads above said base portion, said base portion extending at the sides and ends of said pads to form a flange, and segmental openwork metal sections having oppositely extending diagonally connected ribs fitting in said grooves and over said flanges and having side flanges fitting over the side edges of said pads, and means for securing said pads and openwork sections to the rim of the wheel.

2. A tread attachment for a wheel rim having in combination, resilient segmental pads, each having a flat base portion from which spaced blocks radially project, said blocks being separated by intersecting oppositely extending diagonal grooves, the end edges of said pads extending along the centers of said grooves, thus forming a salient and re-entrant angle, respectively, at the ends of said pad, said base portion extending at the sides of said pad to form a flange, metal segmental openwork sections fitting in said grooves and over said side flanges of the pads, and means for securing said pads and metallic sections to the rim.

3. The structure set forth in claim 2, said segmental openwork sections each having intersecting diagonally and oppositely extending ribs, the ribs at the ends of said sections being half the width of the intermediate ribs and co-operating with the ribs on the adjacent sections to form a rib of full width, said sections thus also having salient and re-entrant angles, respectively, at their ends.

4. A tread attachment for a wheel rim comprising segmental resilient pads having a base portion and symmetrically arranged projections extending radially therefrom, said projections being divided by intersecting grooves extending substantially diagonally across the tread surface, and means disposed in said grooves for holding said pads on said rim.

LUTHER B. BARTH.